(12) United States Patent
Okumura et al.

(10) Patent No.: US 11,407,434 B2
(45) Date of Patent: Aug. 9, 2022

(54) RUBBING PLATE OF SIDE BEARER OF RAILCAR BOGIE AND SIDE BEARER

(71) Applicants: KAWASAKI RAILCAR MANUFACTURING CO., LTD., Hyogo (JP); STARLITE Co., Ltd., Osaka (JP)

(72) Inventors: Yasufumi Okumura, Kobe (JP); Yoshi Sato, Sanda (JP); Keiji Tada, Ashiya (JP); Noriaki Shibita, Amagasaki (JP)

(73) Assignees: KAWASAKI RAILCAR MANUFACTURING CO., LTD., Kobe (JP); STARLITE CO., LTD., Osaka (JP)

( * ) Notice: Subject to any disclaimer, the term of this patent is extended or adjusted under 35 U.S.C. 154(b) by 105 days.

(21) Appl. No.: 16/833,671

(22) Filed: Mar. 30, 2020

(65) Prior Publication Data
US 2020/0307655 A1    Oct. 1, 2020

(30) Foreign Application Priority Data

Mar. 29, 2019    (JP) .............................. JP2019-067322

(51) Int. Cl.
*B61F 5/14*    (2006.01)
*B61F 5/12*    (2006.01)
*B61F 3/08*    (2006.01)

(52) U.S. Cl.
CPC ................ *B61F 5/122* (2013.01); *B61F 3/08* (2013.01)

(58) Field of Classification Search
CPC .. B61F 5/122; B61F 5/14; B61F 5/142; B61F 5/125; B61F 5/144; B61F 5/148; B61F 3/08
See application file for complete search history.

(56) References Cited

U.S. PATENT DOCUMENTS

| | | | |
|---|---|---|---|
| 5,404,826 A * | 4/1995 | Rudibaugh | ............... B61F 5/32 105/222 |
| 2014/0261064 A1* | 9/2014 | Wike | ........................ B61F 5/28 105/198.4 |

FOREIGN PATENT DOCUMENTS

| | | | |
|---|---|---|---|
| CN | 103450670 A | * | 12/2013 |
| JP | 2010-70000 A | | 4/2010 |

* cited by examiner

*Primary Examiner* — Mark T Le
(74) *Attorney, Agent, or Firm* — Xsensus LLP

(57) ABSTRACT

A rubbing plate of a side bearer of a railcar bogie is a rubbing plate of a side bearer provided at the railcar bogie so as to slidably contact a slide member arranged above or under the side bearer. The rubbing plate includes a recess-projection provided on an opposing surface of the rubbing plate, the opposing surface being opposed to a sliding surface of the slide member.

17 Claims, 4 Drawing Sheets

CAR WIDTH DIRECTION

RUBBING PLATE OF SIDE BEARER OF RAILCAR BOGIE AND SIDE BEARER

CROSS REFERENCE TO RELATED APPLICATION

This application claims priority to and the benefit of Japanese Patent Application No. 2019-067322, filed on Mar. 29, 2019, the entire disclosure of which is incorporated herein by reference.

BACKGROUND OF THE INVENTION

1. Field of the Invention

The present disclosure relates to a rubbing plate of a side bearer provided at a railcar bogie and the side bearer.

2. Description of the Related Art

According to direct mounted bogies among bolster-equipped bogies, a side bearer is sandwiched between a bogie frame and a bolster. According to indirect mounted bogies among the bolster-equipped bogies, the side bearer is sandwiched between the bolster and a car body. The side bearer allows the bogie to turn while applying moderate turning resistance to the bogie by frictional resistance of the side bearer (see JP2010-70000A, for example). Typically, the side bearer is arranged in the vicinity of a turning center of the bogie such that the frictional resistance of the side bearer does not become too high when the bogie turns.

If an interval between left and right side bearers can be made to be close to an interval between left and right air springs, a load transfer route of a downward load applied from a car body through a bolster to a bogie frame in order becomes close to a straight line, and therefore, a moment arm is reduced. If this is realized, stress generated at the bogie frame and the bolster decreases, and therefore, the bogie frame and the bolster can be reduced in weight.

However, when the side bearer is reduced in size to make the frictional resistance of the side bearer small, a problem is that the downward load applied from the side bearer locally concentrates on a member (the bogie frame or the bolster) fixed to a lower surface of the side bearer, and therefore, local stress is generated at the member. Further, when a friction coefficient of the side bearer is reduced by applying lubricating oil to the side bearer, a problem is that the lubricating oil needs to be reapplied periodically, and therefore, maintenance work takes time. On this account, the reduction in the frictional resistance of the side bearer has a limit, and this prevents the weight reduction of the bogie at present.

SUMMARY OF THE INVENTION

A rubbing plate of a side bearer of a railcar bogie according to one aspect of the present disclosure is a rubbing plate of a side bearer provided at the railcar bogie so as to slidably contact a slide member arranged above or under the side bearer. The rubbing plate includes a recess-projection provided on an opposing surface of the rubbing plate, the opposing surface being opposed to a sliding surface of the slide member.

According to the above configuration, the sliding surface of the slide member does not contact recesses of the recess-projection of the opposing surface of the rubbing plate but contacts projections of the recess-projection. Therefore, surface pressure applied from the slide member to the rubbing plate by a load from a car body becomes high. When the surface pressure becomes high, a friction coefficient of the rubbing plate becomes small. Therefore, even when the side bearer is arranged away from a turning center of the bogie in a car width direction, the bogie can turn smoothly. On this account, a moment arm is reduced by arranging the side bearer close to an air spring, and with this, stress generated at a bogie frame and a bolster can be reduced, and the weight reduction of the bogie can be realized by the weight reductions of the bogie frame and the bolster.

DESCRIPTION OF THE PREFERRED EMBODIMENTS

Hereinafter, an embodiment will be described with reference to the drawings. In the following description, a direction in which a car travels is defined as a car longitudinal direction (front-rear direction), and a lateral direction perpendicular to the car longitudinal direction is defined as a car width direction (left-right direction).

Figure 1:
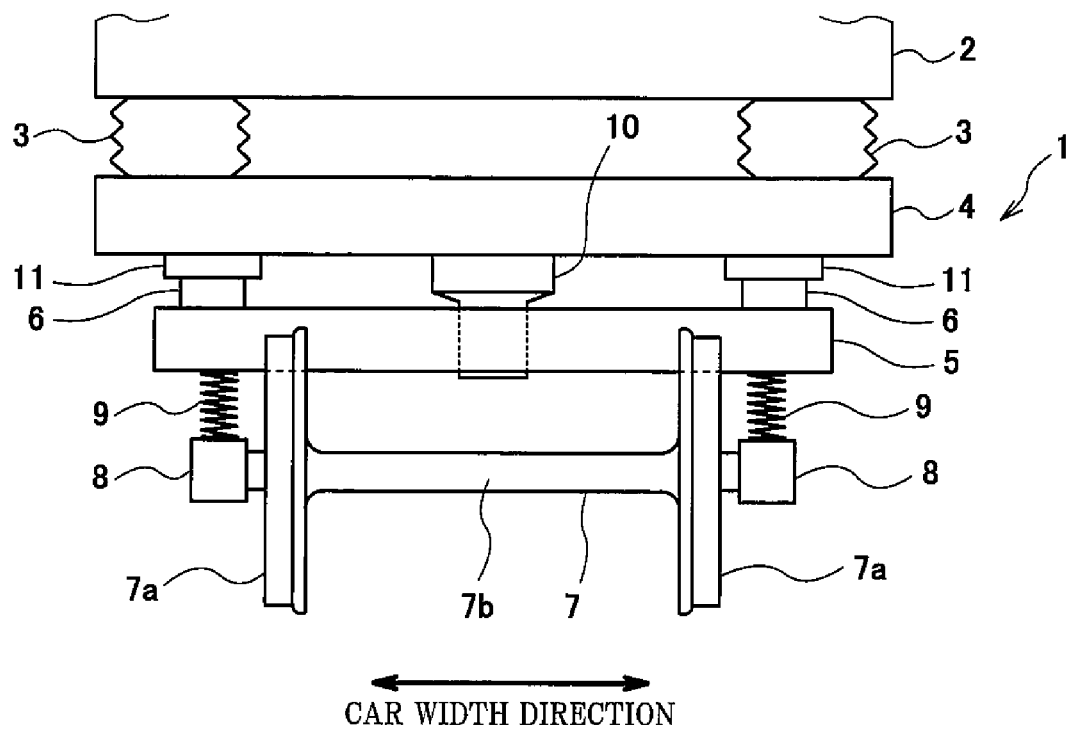
FIG. 1 is a schematic front view of a bolster-equipped bogie including a side bearer according to an embodiment.
Figure 2:
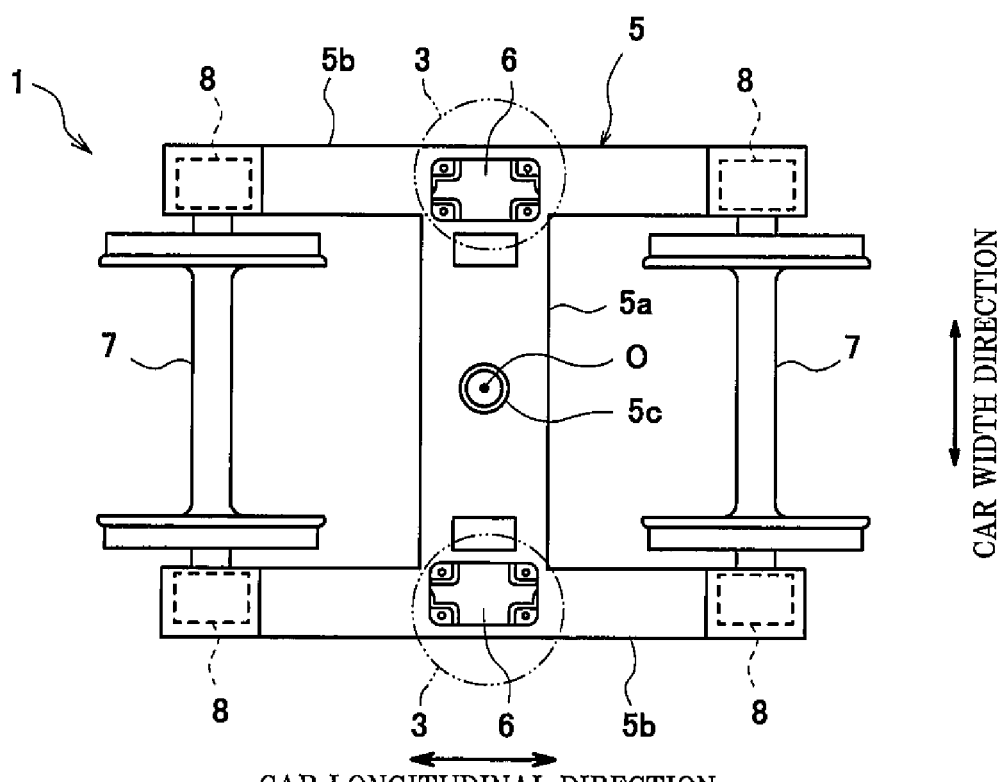
FIG. 2 is a plan view showing that a bolster of the bogie shown in FIG. 1 is detached.

FIG. 1 is a schematic front view of a bolster-equipped bogie 1 including a side bearer according to the embodiment. FIG. 2 is a plan view showing that a bolster 4 of the bogie 1 shown in FIG. 1 is detached. As shown in FIG. 1, the bolster-equipped bogie 1 of a railcar is a direct mounted bogie. The bogie 1 includes the bolster 4, a bogie frame 5, a pair of left and right side bearers 6, wheelsets 7, axle boxes 8, and axle springs 9. The bolster 4 supports a car body 2 through air springs 3. The bogie frame 5 is provided under the bolster 4. The left and right side bearers 6 are interposed between the bolster 4 and the bogie frame 5. Each of the wheelsets 7 includes wheels 7a and an axle 7b. The axle boxes 8 support the wheelsets 7 through bearings. Each of the axle springs 9 is interposed between the corresponding axle box 8 and the bogie frame 5.

A center pin 10 and a pair of slide members 11 are provided on a lower surface of the bolster 4. The center pin 10 projects downward from a car width direction center portion of the lower surface of the bolster 4. The pair of slide members 11 are arranged at both respective car width direction sides of the center pin 10. A lower portion of the center pin 10 is fitted to a car width direction middle portion of the bogie frame 5 so as to be turnable about a vertical axis. The slide members 11 contact the respective side bearers 6 from above. When the bolster 4 and the bogie frame 5 turn relative to each other, the slide members 11 slide on the respective side bearers 6. The slide members 11 are, for example, metal plates made of stainless steel. The side bearers 6 apply turning resistance to the bogie 1 by frictional force generated when the side bearers 6 slide on lower surfaces (sliding surfaces) of the slide members 11 fixed to the bolster 4. Thus, the side bearers 6 suppress a hunting motion of the bogie 1. It should be noted that the positions of the slide members 11 and the positions of the side bearers 6 may be reversed. To be specific, the side bearers 6 may be arranged on the lower surface of the bolster 4, and the slide members 11 may be arranged on an upper surface of the bogie frame 5.

As shown in FIG. 2, the bogie frame 5 includes a cross beam 5a and a pair of side sills 5b. The cross beam 5a extends in the car width direction, and the pair of side sills 5b extends toward both sides in the car longitudinal direction from both respective ends of the cross beam 5a. A fitting portion 5c to which the lower portion of the center pin 10 is fitted so as to be turnable is provided at a middle of the cross beam 5a. To be specific, the bogie frame 5 is turnable relative to the bolster 4 about a turning center O that is a center of the center pin 10 and the fitting portion 5c. The pair of the side bearers 6 are arranged away from the turning center O in the car width direction so as to be located outside the corresponding wheels 7a in the car width direction.

As shown in FIGS. 1 and 2, in a plan view, the side bearers 6 are arranged at positions that overlap the air springs 3. The positions of the side bearers 6 in the car width direction are set so as to overlap the positions of the axle boxes 8 in the car width direction. The downward load from the car body 2 is transferred downward in order of the air springs 3, the bolster 4, the slide members 11, the side bearers 6, and the bogie frame 5.

Figure 3:
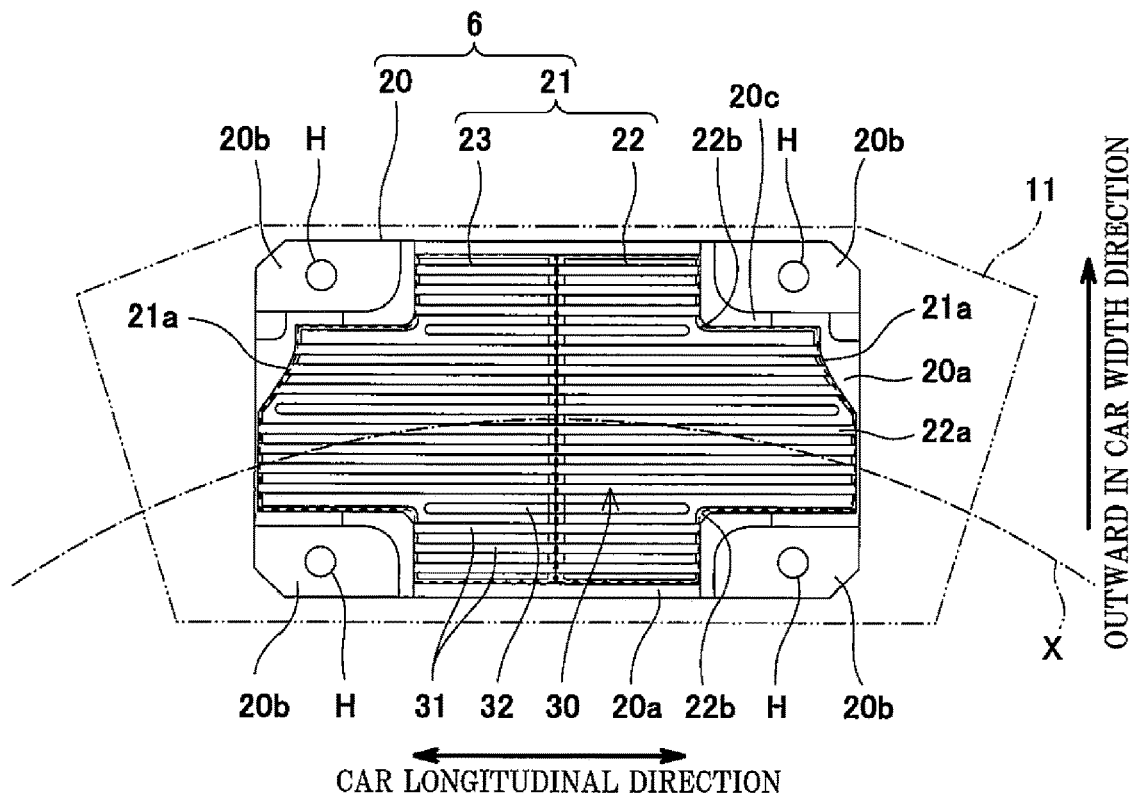
FIG. 3 is a plan view of the side bearer shown in FIG. 2.

FIG. 3 is a plan view of the side bearer 6 shown in FIG. 2. As shown in FIG. 3, the side bearer 6 includes a rubbing plate receiver 20 and a rubbing plate 21. The rubbing plate receiver 20 is fixed to the upper surface of the bogie frame 5. The rubbing plate 21 is directly accommodated in the rubbing plate receiver 20 from above. To be specific, a conventional base plate is not interposed between the rubbing plate receiver 20 and the rubbing plate 21. Therefore, the number of parts is reduced, and assembly work is facilitated. Further, the rubbing plate 21 is positioned only by being accommodated in the rubbing plate receiver 20 without being fixed to the rubbing plate receiver 20 by fixtures. The rubbing plate 21 projects upward beyond an uppermost end of the rubbing plate receiver 20.

The rubbing plate receiver 20 includes an upper surface 20a, projecting walls 20b, and an accommodating recess 20c. The projecting walls 20b project upward from the upper surface 20a. The accommodating recess 20c is a recessed space defined by the upper surface 20a and the projecting walls 20b. Bolt holes H extending in a vertical direction are formed at the respective projecting walls 20b. To be specific, the rubbing plate receiver 20 is fixed to the bogie frame 5 by bolts (not shown) inserted in the bolt holes H. In the present embodiment, the projecting walls 20b projects upward from at least four corners of the upper surface 20a of the rubbing plate receiver 20 having a rectangular shape in a plan view, and with this, the accommodating recess 20c having a substantially cross shape in a plan view is formed by the upper surface 20a and the projecting walls 20b. The rubbing plate 21 accommodated in the accommodating recess 20c is also formed in a substantially cross shape as a whole.

A movement trajectory X of a center point of a contact region of the rubbing plate 21 contacting the slide member 11 when the bogie frame 5 turns relative to the bolster 4 while the bogie 1 is passing through a curved line forms a circular-arc shape that is convex outward in the car width direction. Therefore, in terms of the share of the load, the degree of contribution of a car width direction inside region of each of both car longitudinal direction end portions of the rubbing plate 21 is higher than the degree of contribution of a car width direction outside region of each of both car longitudinal direction end portions of the rubbing plate 21. On this account, cutout portions 21a are provided at respective car width direction outside portions of the car longitudinal direction end portions of the rubbing plate 21, and therefore, the car width direction outside regions of the car longitudinal direction end portions of the rubbing plate 21 are smaller than the car width direction inside regions of the car longitudinal direction end portions of the rubbing plate 21. It should be noted that the slide member 11 is larger in area than the side bearer 6 and longer in the car longitudinal direction than the side bearer 6.

In the present embodiment, from the viewpoint of manufacturability and the like, the rubbing plate 21 is divided in half in the car longitudinal direction, i.e., the rubbing plate 21 is constituted by two rubbing plates 22 and 23. It should be noted that the rubbing plate 21 may be formed as a single plate without being divided. The rubbing plate 22 and the rubbing plate 23 are made of the same material and have symmetric shapes. Therefore, the following will describe the rubbing plate 22, and a detailed explanation of the rubbing plate 23 is omitted.

Figure 4:
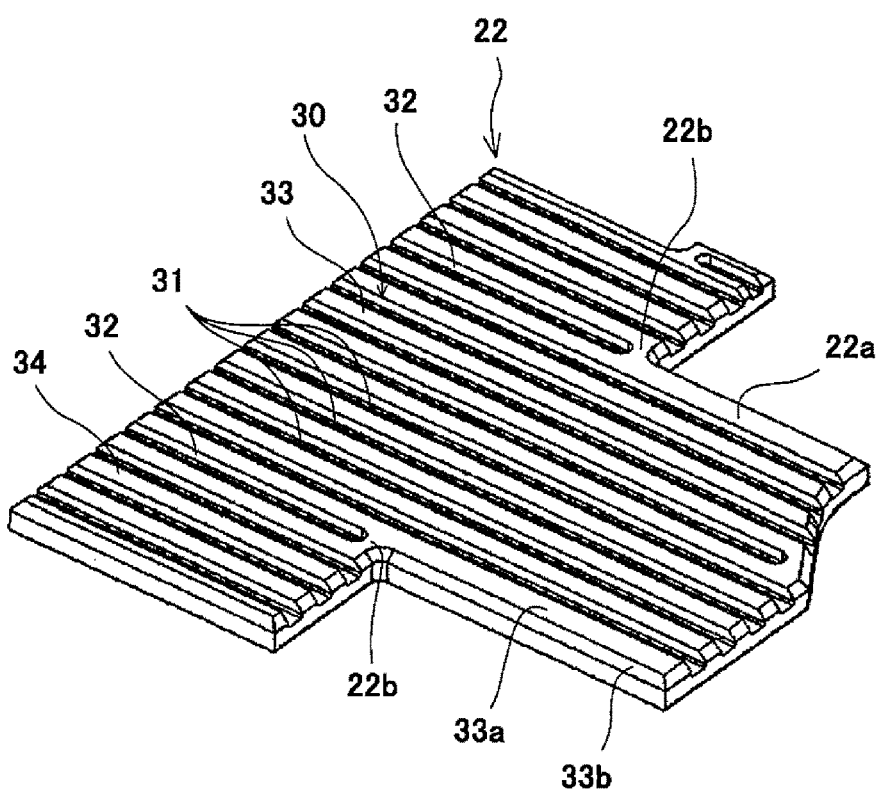
FIG. 4 is a perspective view of a rubbing plate of the side bearer shown in FIG. 3.

FIG. 4 is a perspective view of the rubbing plate 22 of the side bearer 6 shown in FIG. 3. As shown in FIGS. 3 and 4, the rubbing plate 22 includes an upper surface 22a opposed to the lower surface of the slide member 11, and a plurality of grooves 31 and 32 parallel to each other are formed on the upper surface 22a. To be specific, by forming the plurality of grooves 31 and 32, a recess-projection 30 is provided on the upper surface 22a of the rubbing plate 22. Therefore, the lower surface of the slide member 11 does not contact the grooves 31 and 32 (recesses) of the recess-projection 30 of the upper surface 22a of the rubbing plate 22 but contacts projections 33. Thus, a contact area of the rubbing plate 22 contacting the slide member 11 is made small.

With this, surface pressure applied from the slide member 11 to the rubbing plate 22 by the load from the car body 2 becomes higher than when the upper surface 22a of the rubbing plate 22 is uniformly flat. When the surface pressure becomes high, a friction coefficient of the rubbing plate 22 becomes small. Therefore, even when the side bearers 6 are arranged away from the turning center O of the bogie 1 in the car width direction, the bogie 1 can turn smoothly. On this account, a moment arm is reduced by arranging the side bearers 6 close to the respective air springs 3, and with this, stress generated at the bolster 4 can be reduced, and the weight reduction of the bolster 4 can be realized.

The grooves 31 and 32 extend in a direction in which the side bearer 6 slides on the slide member 11. Specifically, the grooves 31 and 32 of the present embodiment extend linearly in the car longitudinal direction. With this, corners of the projections 33 hardly become resistance when the slide member 11 and the rubbing plate 22 slide on each other. Thus, the frictional resistance at the time of sliding can be further reduced. In addition, since the grooves 31 and 32 are linear, the grooves 31 and 32 are easily formed. Further, a corner between an upper end surface 33a and side surface 33b of each of the projections 33 forming an outer periphery of the rubbing plate 22 among the projections 33 is formed to have an obtuse angle. With this, the corner of the projection 33 can be further prevented from becoming the sliding resistance. It should be noted that each of the grooves 31 and 32 may be formed in a circular-arc shape parallel to the movement trajectory X of the center point of the contact region of the rubbing plate 21 contacting the slide member 11. This is further preferable from the viewpoint of the reduction in the frictional resistance.

The recess-projection 30 is uniformly formed on the entire upper surface 22a of the rubbing plate 22. In a plan view, a total of areas of the upper end surfaces 33a of the projections 33 of the recess-projection 30 is 30% to 70% of an area of the upper surface 22a of the rubbing plate 22. In the present embodiment, in a plan view, the total of the areas of the upper end surfaces 33a of the projections 33 of the recess-projection 30 is set to a value within a range of 40% to 60% of the area of the upper surface 22a of the rubbing plate 22. With this, the surface pressure applied to the rubbing plate 22 can be increased while preventing the load applied to the projections 33 of the rubbing plate 22 from becoming excessive. Further, the width of the projection 33 and the width of the groove 31 are set to be equal to each other, and the arrangement of the recess-projection 30 is set to be uniform. Then, the friction coefficient is set to be a desired value. Therefore, uneven wear of the rubbing plate 22 can be prevented.

Among the grooves 31 and 32, corner portions 22b of the rubbing plate 22 do not exist on extended lines of the grooves 31. Each of such grooves 31 extends to an end edge of the rubbing plate 22 and is open toward both sides in an extending direction. Further, among the grooves 31 and 32, the corner portions 22b of the rubbing plate 22 exist on respective extended lines of the grooves 32. An end portion of each of such grooves 32 which portion is opposed to the corresponding corner portion 22b is terminated in front of the end edge of the rubbing plate 22. With this, the thicknesses of the corner portions 22b of the rubbing plate 22 are secured, and therefore, the strengths of the corner portions 22b are maintained.

The rubbing plate 22 is made of resin or metal. In the present embodiment, the rubbing plate 22 is made of, for example, super engineering plastic. When the rubbing plate 22 is made of resin, the recess-projection 30 on the upper surface of the rubbing plate 22 is formed by molding. When the rubbing plate 22 is made of metal, the recess-projection 30 on the upper surface of the rubbing plate 22 is formed by machining or machine work. It should be noted that the recess-projection 30 of the rubbing plate 22 may be formed by a method other than the machining or machine work.

A lubricating coating layer 34 is provided on at least the projections 33 on the upper surface 22a of the rubbing plate 22. The lubricating coating layer 34 is formed by coating at least the surfaces of the projections 33 with lubricant. The lubricating coating layer 34 is made of, for example, silicone resin or fluorine resin. In the present embodiment, the lubricating coating layer 34 is formed by spraying silicone resin or fluorine resin on the entire upper surface 22a of the rubbing plate 22.

The friction coefficient of the rubbing plate 22 tends to be large when the rubbing plate 22 is new. As the rubbing plate 22 is being used, the friction coefficient of the rubbing plate 22 tends to decrease and then stabilize. Therefore, when the rubbing plate 22 is new, the friction coefficient of the rubbing plate 22 can be reduced by providing the lubricating coating layer 34. Further, as the rubbing plate 22 is being used, the lubricating coating layer 34 comes off, but the friction coefficient of the rubbing plate 22 itself decreases. Therefore, maintenance work of periodically reapplying lubricating coating is unnecessary, and the friction coefficient can be stably made low over the entire use period of the rubbing plate 22.

Figure 5:
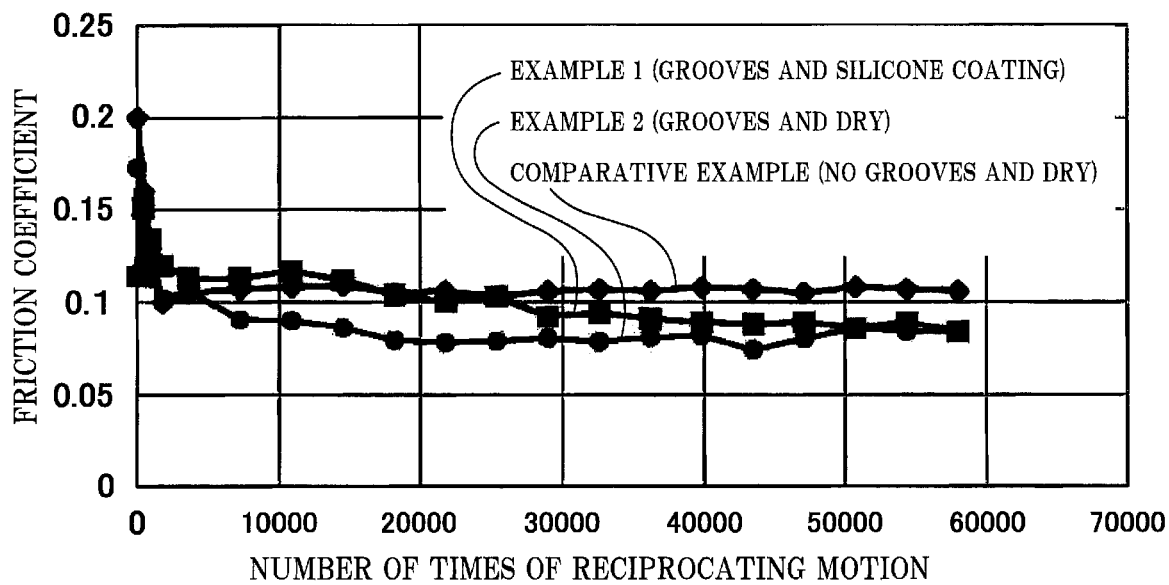
FIG. 5 is a graph showing time-lapse changes of friction coefficients in Examples 1 and 2 and Comparative Example.
Figure 6:
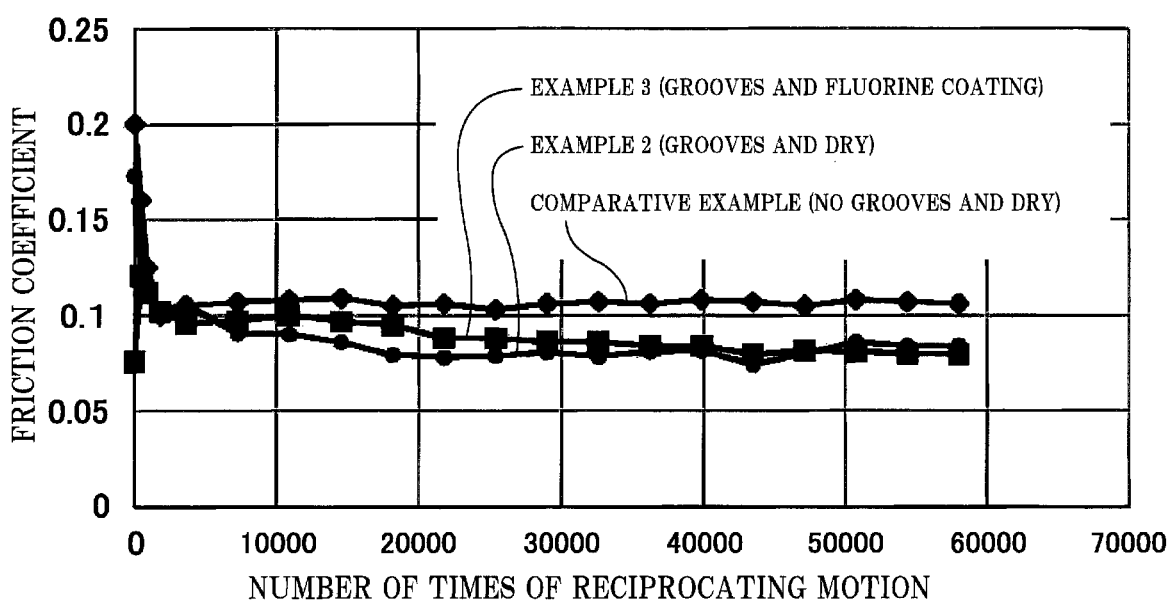
FIG. 6 is a graph showing time-lapse changes of the friction coefficients in Examples 2 and 3 and Comparative Example.

FIG. 5 is a graph showing time-lapse changes of the friction coefficients in Examples 1 and 2 and a Comparative Example. FIG. 6 is a graph showing time-lapse changes of the friction coefficients in Examples 2 and 3 and the Comparative Example. In Example 1, the rubbing plate including the grooves 31 and 32 and the lubricating coating layer 34 made of silicone resin was subjected to a reciprocating sliding test. In Example 2, the rubbing plate including the grooves 31 and 32 but not including the lubricating coating layer 34 was subjected to the reciprocating sliding test. In Example 3, the rubbing plate including the grooves 31 and 32 and the lubricating coating layer 34 made of fluorocarbon resin was subjected to the reciprocating sliding test. In the Comparative Example, the rubbing plate not including the grooves 31 and 32 and not including the lubricating coating layer 34 was subjected to the reciprocating sliding test.

As shown in FIGS. 5 and 6, the friction coefficients in Examples 1 to 3 are smaller than the friction coefficient in the Comparative Example as a whole. To be specific, it is confirmed that the friction coefficient of the rubbing plate including the grooves 31 and 32 is smaller than the friction coefficient of the rubbing plate not including the grooves 31 and 32. Further, it is found that: the friction coefficient of the rubbing plate tends to become large at an initial stage of the reciprocating sliding test; and as the number of times of the reciprocating motion increases, the friction coefficient tends to decrease and then stabilize. It is confirmed that since the lubricating coating layer 34 is included in Examples 1 and 3, the friction coefficients in Examples 1 and 3 are smaller at the initial stage of the reciprocating sliding test than the friction coefficient in Example 2 in which the lubricating coating layer 34 is not included. Although the lubricating coating layer 34 comes off as the number of times of the reciprocating motion in the reciprocating sliding test increases, it is confirmed that since the friction coefficient of the rubbing plate itself decreases, the friction coefficient stabilizes at a low level. In FIGS. 5 and 6, the Comparative Example experiences more friction than the other examples. Therefore, the friction coefficient of the Comparative Example is higher in FIGS. 5 and 6 than the specific examples, and the Comparative Example the highest graph in FIGS. 5 and 6.

The present invention is not limited to the above embodiment. Modifications, additions, and eliminations may be made with respect to the configuration of the embodiment. In the above embodiment, the bogie 1 is a direct mounted bogie. However, the bogie 1 may be an indirect mounted bogie. In this case, the side bearers 6 are interposed between the bolster and the car body. Further, in the above embodiment, the bogie is configured such that the cross beam 5a is supported by the axle boxes 8 from below through the side sills 5b and the axle springs 9. However, for example, the bogie may be configured such that: the side sills are omitted from the bogie frame; and the cross beam is supported by the axle boxes from below through plate springs. In the above embodiment, the rubbing plate is directly accommodated in the rubbing plate receiver. However, a base plate may be interposed between the rubbing plate and the rubbing plate receiver.

Figure 7:
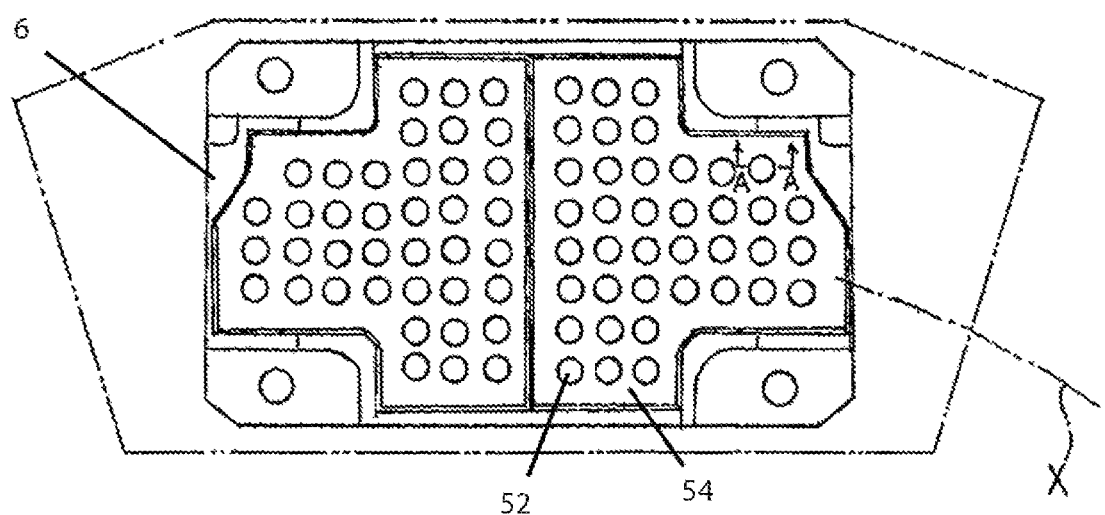
FIG. 7 is a plan view of an alternative side bearer which utilizes circular recesses.
Figure 8:
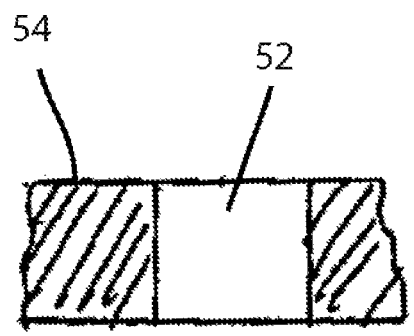
FIG. 8 is a cross sectional view taken along line A-A of FIG. 7 showing a through-hole as the recess.
Figure 9:
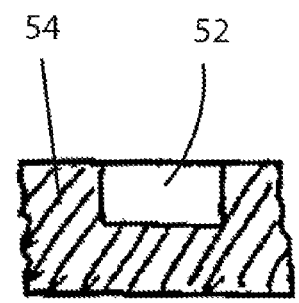
FIG. 9 is a cross sectional view taken along line A-A of FIG. 7 showing an indent as the recess.

Instead of the recess-projection 30, FIG. 7 illustrates an alternative embodiment in which a recess 52 is a through-hole or circular indent. In this document, the term "recess" generically designates both a complete through-hole which completely passes through the side bearer 6 as illustrated in FIG. 8, or the indent illustrated in FIG. 9. In the embodiment of FIG. 7, the recesses 52 may be arranged so as to be lined up in parallel with each other at regular intervals or may be arranged zigzag. Even in this case, in a plan view, the percentage of the area obtained by subtracting the areas of the recesses from the area of the rubbing plate 22 is set to 30% to 70% of the area of the rubbing plate 22, although other percentages are possible.

Obviously, numerous modifications and variations of the present invention are possible in light of the above teachings. It is therefore to be understood that within the scope of the appended claims, the invention may be practiced otherwise than as specifically described herein.

What is claimed is:

1. A rubbing plate for use with a side bearer of a railcar bogie, the side bearer being at the railcar bogie so as to slidably contact a slider above or under the side bearer, the rubbing plate comprising:
    an opposing surface opposed to a sliding surface of the slider, the opposing surface including grooves,
    wherein:
    the grooves extend in a direction in which the rubbing plate of the side bearer slides on the slider,
    the rubbing plate has a substantially cross shape in a plan view, and
    the substantially cross shaped rubbing plate has a longitudinal part extending along a car longitudinal direction and a crossing part extending along a car width direction, wherein the longitudinal part includes cutout portions at two corners of both ends thereof such that the longitudinal part is tapered, in the car width direction, toward an outside side of the longitudinal part.

2. The rubbing plate according to claim 1, wherein in a plan view, a total of areas of end surfaces of the grooves subtracted from an area of the opposing surface of the rubbing plate is 30% to 70% of the area of the opposing surface of the rubbing plate.

3. The rubbing plate according to claim 1, wherein a lubricating coating layer is on a plurality of projections of the rubbing plate, the lubricating coating layer including silicone resin or fluorine resin.

4. The rubbing plate according to claim 1, further comprising:
    projections on an opposing surface of the rubbing plate,
    wherein a corner between an end surface and side surface of a projection of each of the projections which projection forms an outer periphery of the rubbing plate includes an obtuse angle.

5. A side bearer of a railcar bogie, the side bearer for use with the railcar bogie so as to slidably contact a slider arranged above or under the side bearer, the side bearer comprising:
    a rubbing plate; and
    a rubbing plate receiver for fixing to the railcar bogie and directly accommodating the rubbing plate,
    wherein the rubbing plate includes:
    an opposing surface opposed to a sliding surface of the slider, the opposing surface including recesses including through holes or indents,
    the rubbing plate has a substantially cross shape in a plan view, and
    the substantially cross shaped rubbing plate has a longitudinal part extending along a car longitudinal direction and a crossing part extending along a car width direction, wherein the longitudinal part includes cutout portions at two corners of both ends thereof such that the longitudinal part is tapered, in the car width direction, toward an outside side of the longitudinal part.

6. A railcar bogie, comprising:
    a bolster to support a car body;
    a bogie frame;
    a sliding unit, slidably disposed between the bolster and the bogie frame, the sliding unit including:
    a slider; and
    a side bearer to slidably contact the slider, the side bearer including:
    a rubbing plate;
    a rubbing plate receiver for fixing to accommodate the rubbing plate, the rubbing plate includes an opposing surface opposed to a sliding surface of the slider, the opposing surface including grooves,
    wherein:
    the grooves extend in a direction in which the rubbing plate of the side bearer slides on the slider,
    the rubbing plate has a substantially cross shape in a plan view, and
    the substantially cross shaped rubbing plate has a longitudinal part extending along a car longitudinal direction and a crossing part extending along a car width direction, wherein the longitudinal part includes cutout portions at two corners of both ends thereof such that the longitudinal part is tapered, in the car width direction, toward an outside side of the longitudinal part.

7. The railcar bogie according to claim 6, wherein in a plan view, a total of areas of end surfaces of the recesses subtracted from an area of the opposing surface of the rubbing plate is 30% to 70% of an area of the opposing surface of the rubbing plate.

8. The railcar bogie according to claim 6, wherein a lubricating coating layer is on the plurality of projections of the rubbing plate, the lubricating coating layer including silicone resin or fluorine resin.

9. The railcar bogie according to claim 6, further comprising:
    projections on an opposing surface of the rubbing plate,
    wherein a corner between an end surface and side surface of a projection of each of the projections which projection forms an outer periphery of the rubbing plate includes an obtuse angle.

10. The rubbing plate according to claim 1, wherein the rubbing plate is divided in half in the car longitudinal direction.

11. The side bearer according to claim 5, wherein in a plan view, a total of areas of end surfaces of the recesses subtracted from an area of the opposing surface of the rubbing plate is 30% to 70% of the area of the opposing surface of the rubbing plate.

12. The side bearer according to claim 5, wherein a lubricating coating layer is on the plurality of recesses of the rubbing plate, the lubricating coating layer including silicone resin or fluorine resin.

13. The side bearer according to claim 5, further comprising:
    projections on an opposing surface of the rubbing plate,
    wherein a corner between an end surface and side surface of a projection of each of the projections which projection forms an outer periphery of the rubbing plate includes an obtuse angle.

14. The side bearer according to claim 5, wherein the rubbing plate is divided in half in the car longitudinal direction.

15. The side bearer according to claim 5, wherein the rubbing plate receiver includes:

projecting walls projects upward from four corners of an upper surface of the rubbing plate receiver having a rectangular shape in a plan view, and an accommodating recess having a substantially cross shape in a plan view, the accommodating recess being formed by the upper surface and the projecting walls, the accommodating recess accommodating the rubbing plate.

16. The railcar bogie according to claim 6, wherein the rubbing plate is divided in half in the car longitudinal direction.

17. The railcar bogie according to claim 6, wherein the rubbing plate receiver includes:

projecting walls projects upward from four corners of an upper surface of the rubbing plate receiver having a rectangular shape in a plan view, and an accommodating recess having a substantially cross shape in a plan view, the accommodating recess being formed by the upper surface and the projecting walls, the accommodating recess accommodating the rubbing plate.

\* \* \* \* \*